US006338476B1

(12) United States Patent
Takahashi

(10) Patent No.: US 6,338,476 B1
(45) Date of Patent: Jan. 15, 2002

(54) CLAMP APPARATUS

(75) Inventor: Kazuyoshi Takahashi, Tokyo (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/548,275

(22) Filed: Apr. 12, 2000

(30) Foreign Application Priority Data

Apr. 28, 1999 (JP) .......................................... 11-123037
Dec. 6, 1999 (JP) .......................................... 11-346824

(51) Int. Cl.[7] ................................................ B23Q 3/08

(52) U.S. Cl. ............................ 269/32; 269/27; 269/228

(58) Field of Search .......................... 269/32, 228, 233, 269/93, 94, 235, 239, 27, 24, 285

(56) References Cited

U.S. PATENT DOCUMENTS 4,458,889 A 7/1984 McPherson et al.
5,996,984 A 12/1999 Takahashi

*Primary Examiner*—Robert C. Watson
(74) *Attorney, Agent, or Firm*—Oblon, Spivak, McClelland, Maier & Neustadt, P.C.

(57) ABSTRACT

A clamp apparatus comprises a cylinder unit for displacing a rod member provided at the inside of a body in an axial direction of the body, and a link plate for being connected to the rod member, and it further comprises a toggle link mechanism for converting rectilinear motion of the rod member into rotary motion, an arm for making rotation by a predetermined angle in accordance with a driving action of the cylinder unit, and a guide roller supported by the body, the guide roller being rotatable while making contact with a curved surface of the link plate.

10 Claims, 21 Drawing Sheets

CLAMP APPARATUS

BACKGROUND OF THE INVENTION

1. Field of the Invention

The present invention relates to a clamp apparatus capable of clamping a workpiece by using an arm which is rotatable by a predetermined angle in accordance with a driving action of a driving mechanism.

2. Description of the Related Art

The clamp cylinder has been hitherto used, for example, in order to clamp a constitutive part when the constitutive part of an automobile or the like is welded. Such a clamp cylinder is disclosed, for example, in U.S. Pat. No. 4,458,889.

The clamp cylinder disclosed in U.S. Pat. No. 4,458,889 is shown in FIGS. 22 and 23. A piston rod 2 is arranged movably back and forth between a pair of dividable bodies 1*a*, 1*b*. A coupling 3 is connected to one end of the piston rod 2. A pair of links 5*a*, 5*b* and a pair of rollers 6*a*, 6*b* are attached rotatably by the aid of a first shaft 4 on both sides of the coupling 3 respectively. An arm 8, which is rotatable by a predetermined angle, is connected between the pair of links 5*a*, 5*b* by the aid of a second shaft 7.

In this arrangement, the pair of rollers 6*a*, 6*b* are provided rotatably by the aid of a plurality of needles 9*a* installed to a hole. The piston rod 2 is provided so that it is displaced integrally with the rollers 6*a*, 6*b* in accordance with the guiding action of the rollers 6*a*, 6*b* which make sliding movement along track grooves 9*b* formed on the bodies 1*a*, 1*b* respectively.

However, the clamp cylinder disclosed in U.S. Pat. No. 4,458,889 concerning the conventional technique described above involves the following inconvenience. That is, when an unillustrated workpiece is clamped by the arm 8, the clamping force is decreased due to the change of the angle of rotation of the arm 8.

In the case of the clamp cylinder described above, the reaction force, which is generated when the workpiece is clamped by the arm 8, is applied to the first shaft 4. Therefore, it is necessary to design the diameter of the first shaft 4 considering, for example, the surface pressure and the strength. As a result, an inconvenience arises in that the diameter of the first shaft 4 is increased.

Further, it is necessary to design the wall thickness and the diameter of the rollers 6*a*, 6*b* considering the surface pressure and the strength of the pair of rollers 6*a*, 6*b* which make sliding movement along the track grooves 9*b*. As a result, the following inconvenience arises. That is, the shape of the pair of rollers 6*a*, 6*b* is increased, in accordance with which the size of the bodies 1*a*, 1*b* is increased.

SUMMARY OF THE INVENTION

A general object of the present invention is to provide a clamp apparatus which makes it possible to maintain a substantially constant clamping force even when the angle of rotation of an arm is changed when a workpiece is clamped.

A principal object of the present invention is to provide a clamp apparatus which makes it possible to decrease the diameter of a knuckle pin by receiving the reaction force generated upon the clamping by using a guide roller.

Another object of the present invention is to provide a clamp apparatus which makes it possible to realize a small size of a body.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
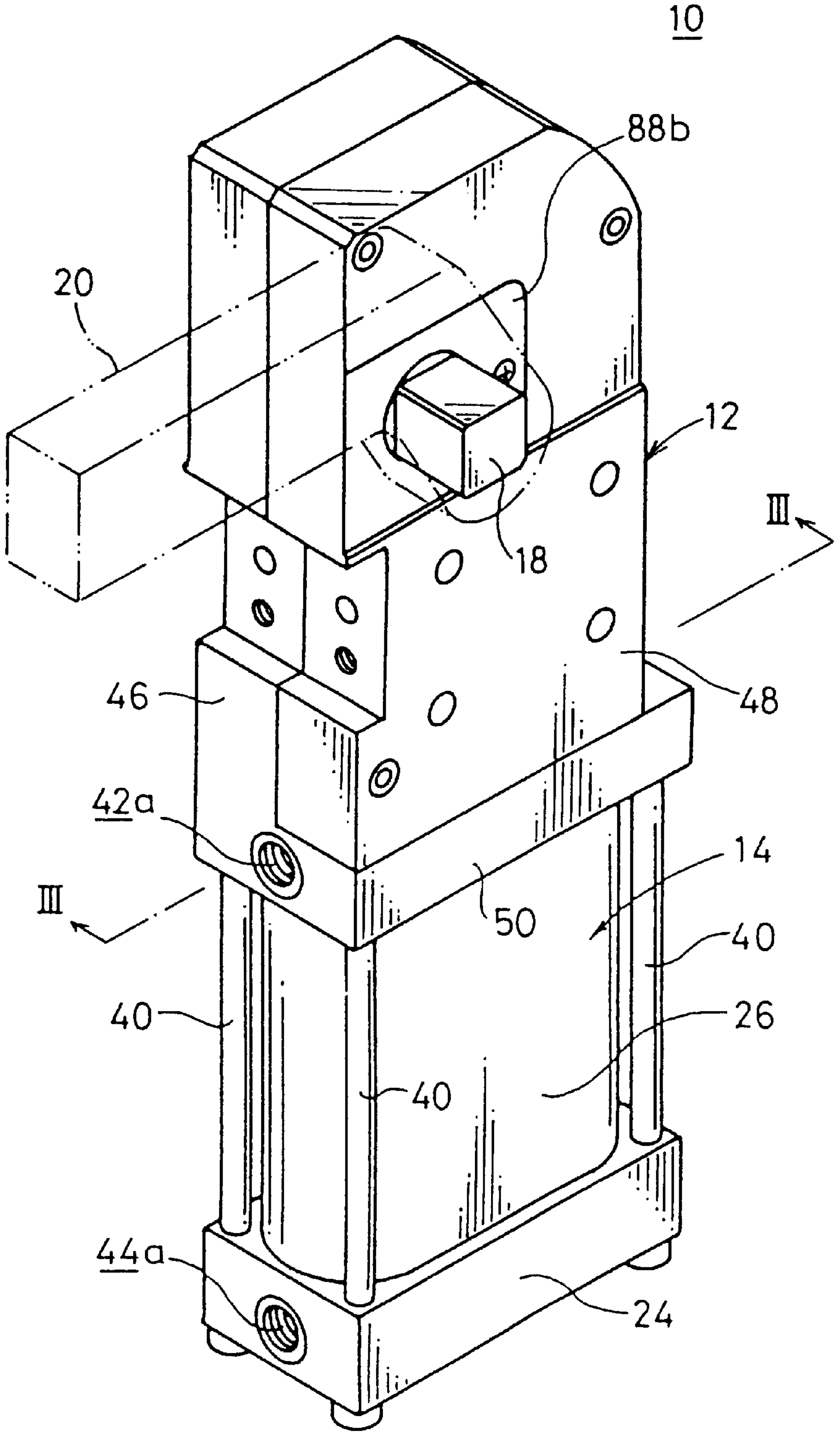
FIG. 1 shows a perspective view illustrating a clamp apparatus according to an embodiment of the present invention.

With reference to FIG. 1, reference numeral 10 indicates a clamp apparatus according to an embodiment of the present invention. The clamp apparatus 10 comprises a body 12 which is formed to have a flat configuration, a cylinder unit (driving mechanism) 14 which is coupled in an air-tight manner to the lower end of the body 12, and an arm 20 which is coupled to a rectangular bearing section 18 protruding to the outside through a pair of substantially circular openings 16*a*, 16*b* (see FIG. 5) formed through the body 12.

The cylinder unit 14 includes an end block 24 which has an unillustrated elliptic recess formed on its upper surface, and a cylinder tube 26 which is composed of a cylinder having an elliptic cross section with its first end coupled in an air-tight manner to the recess of the end block 24 and with its second end coupled in an air-tight manner to the bottom surface of the body 12.

Figure 3:
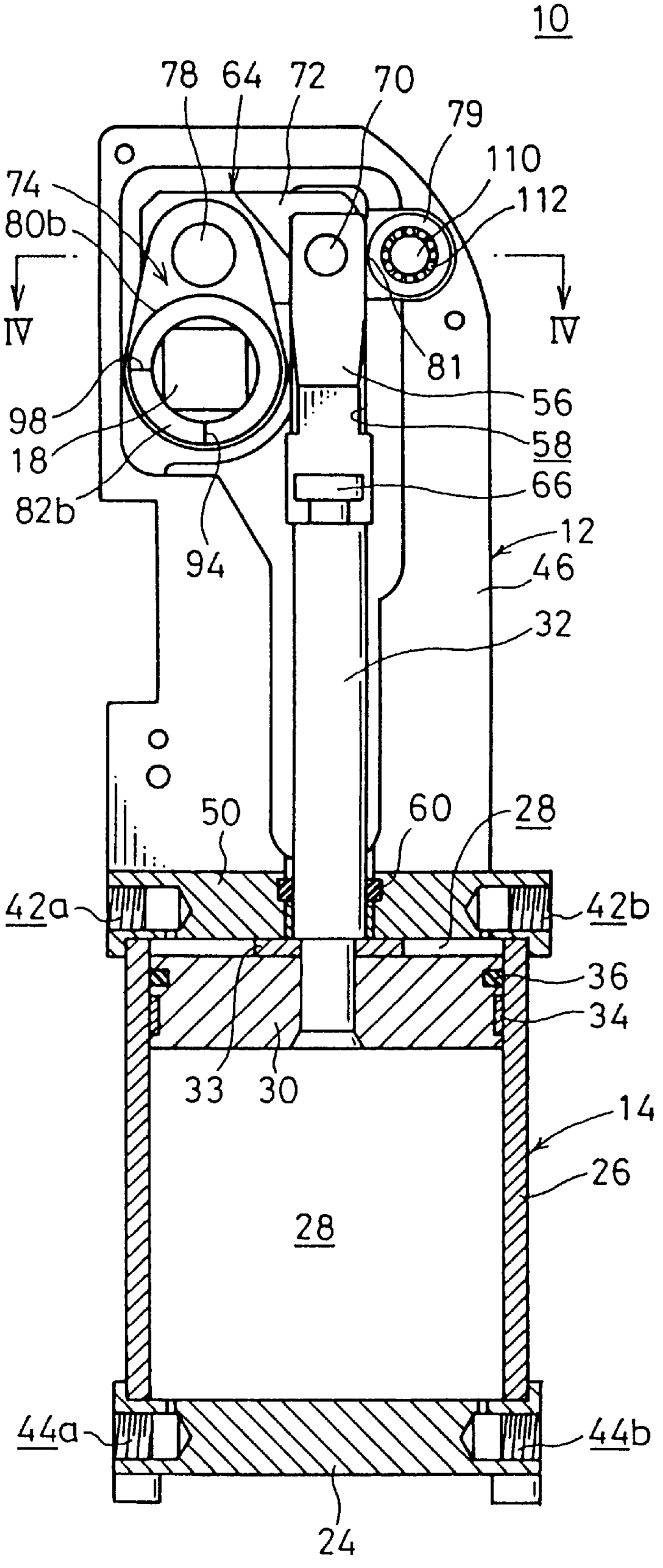
FIG. 3 shows a longitudinal sectional view of the arrangement taken along a line III—III shown in FIG. 1.
Figure 4:
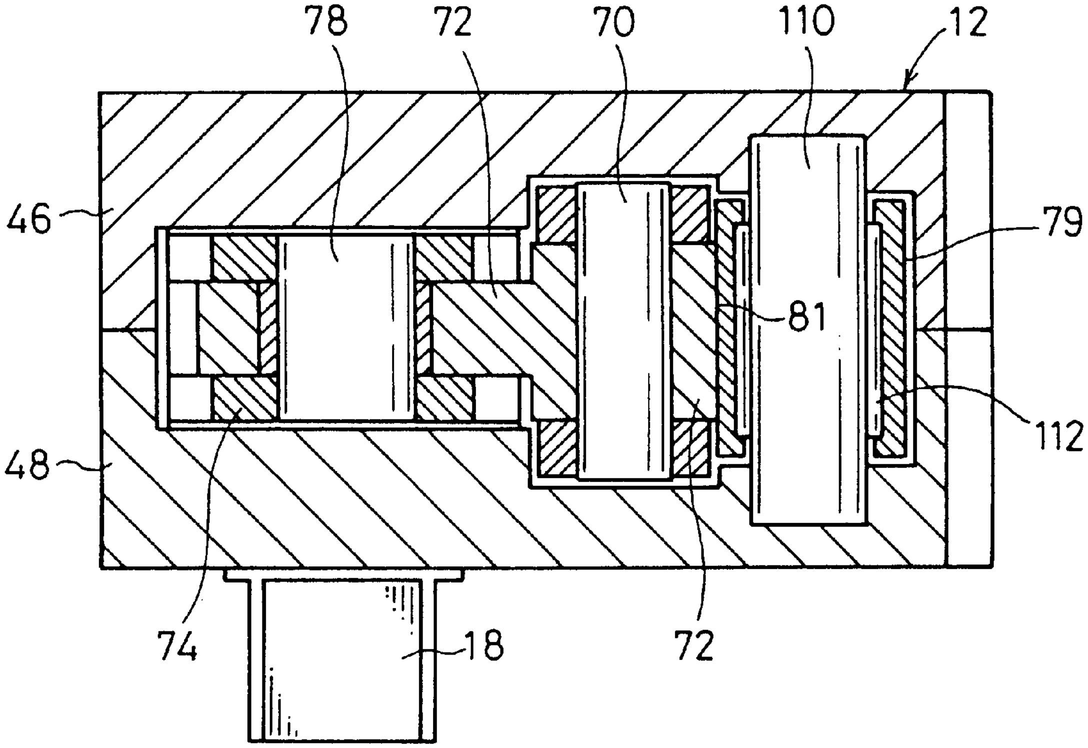
FIG. 4 shows a cross-sectional view of the arrangement taken along a line IV—IV shown in FIG. 3.

As shown in FIG. 3, the cylinder unit 14 further comprises a piston 30 which is accommodated in the cylinder tube 26 and which makes reciprocating movement along a cylinder chamber 28, a rod member 32 which is coupled to a central portion of the piston 30 and which is displaceable integrally with the piston 30, and a ring-shaped spacer 33 which is provided at the connecting portion between the piston 30 and the rod member 32 and which is externally fitted to the rod member 32 via a hole. The spacer 33 is made of a metal material such as aluminum. The spacer 33 abuts against the wall surface of a projection 50 for forming the upper portion of the cylinder chamber 28 at the terminal end position of the displacement of the pinto 30, and thus it functions as a stopper for regulating the displacement of the piston 30. Alternatively, the piston 30 and the spacer 33 may be formed to be integrated into one unit.

As shown in FIG. 3, a wear ring 34 and a piston packing 36 are installed to the outer circumferential surface of the piston 30 respectively. Unillustrated attachment holes are bored through four corner portions of the end block 24. The end block 24 and the cylinder tube 26 are assembled in an air-tight manner to the body 12 by the aid of four shafts 40 inserted through the attachment holes (see FIGS. 1 and 2). Pairs of pressure fluid inlet/outlet ports 42*a*, 42*b, 44 a*, 44*b*, which are used to introduce and discharge the pressure fluid (for example, compressed air) with respect to the cylinder chamber 28 respectively, are formed mutually opposingly in the body 12 and the end block 24 respectively (see FIG. 3).

When the clamp apparatus 10 is practically used, unillustrated blank caps are screwed into any pair of the pressure fluid inlet/outlet ports 42*a*, 44*a* (42*b*, 44*b*). Thus, the clamp apparatus 10 is used in a state in which one of the pairs of pressure fluid inlet/outlet ports 42*a*, 44*a* (42*b*, 44*b*) are closed.

Figure 5:
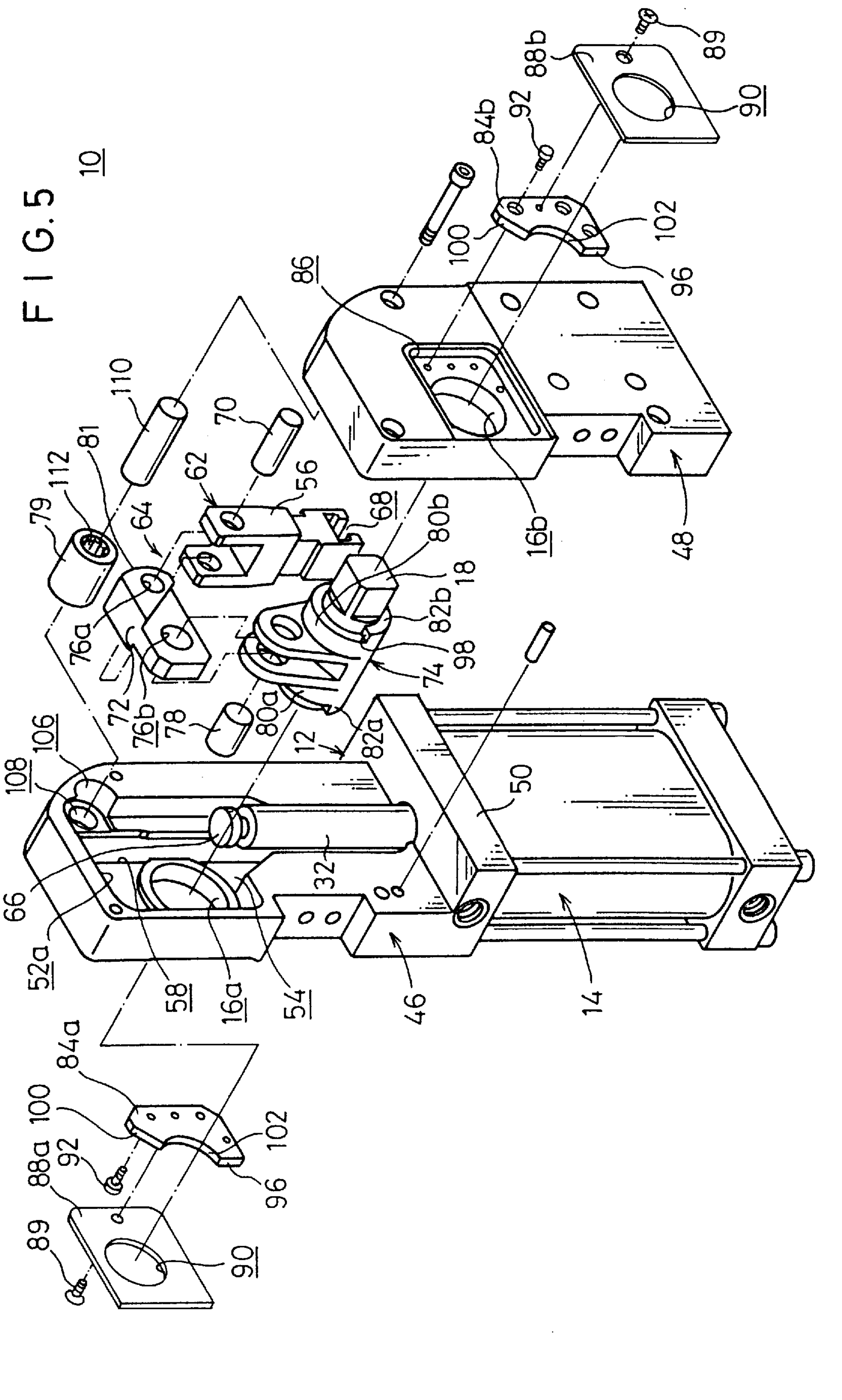
FIG. 5 shows an exploded perspective view illustrating the body for constructing the clamp apparatus.

As shown in FIG. 5, the body 12 comprises a first casing 46 and a second casing 48 which are asymmetric and which are assembled in an integrated manner. A projection 50, which protrudes by a predetermined length in a substantially horizontal direction and which functions as a rod cover, is formed in an integrated manner at the lower end of the first casing 46. The second casing 48 is formed to have a size in the longitudinal direction which is shortened by a thickness of the projection 50 as compared with the first casing 46. In this arrangement, as shown in FIG. 5, the body 12 can be conveniently disassembled by detaching the second casing 48 from the first casing 46 without disassembling the cylinder unit 14.

As shown in FIG. 5, a chamber 54 is formed in the body 12 by recesses 52*a*, 52*b* formed for the first casing 46 and the second casing 48 respectively (provided that the recess 52*b* is omitted from the illustration because it has the same structure as that of the recess 52*a*). The free end of the rod member 32 is provided to face in the chamber 54. In this arrangement, the rod member 32 is guided linearly reciprocatively by the aid of guide grooves 58 which are formed on the respective inner wall surfaces of the first casing 46 and the second casing 48 respectively and on which a knuckle block 56 is slidable as described later on. A rod packing 60 (see FIG. 3) for surrounding the outer circumferential surface of the rod member 32 is provided at a through-hole formed in the projection 50.

As shown in FIG. 5, a toggle link mechanism 64, which is used to convert the rectilinear motion of the rod member 32 into the rotary motion of the arm 20 by the aid of a knuckle Joint 62, is provided at a first end of the rod member 32. The knuckle joint 62 comprises a knuckle block 56 having a forked section with branches separated by a predetermined spacing distance and branched substantially in parallel to one another, and a knuckle pin 70 for being rotatably attached to a hole formed in the forked section.

As shown in FIG. 5, a groove 68 having a T-shaped cross section, with which a disk-shaped projection 66 of the rod member 32 is engaged, is formed at a bottom surface portion of the knuckle block 56 to extend in a substantially horizontal direction. In this arrangement, predetermined clearances are formed between the groove 68 and the projection 66 formed integrally with the rod member 32 and between the knuckle block 56 and the guide groove 58. The knuckle block 56 is provided displaceably substantially horizontally along the groove 68. Thus, the rod member 32 is prevented from transmission of any load in the lateral direction. In other words, by providing the degree of freedom for the knuckle block 56, for example, when a workpiece is clamped, then no lateral load is applied, for example, to the rod member 32 and the rod packing 60, and the stroke of the rod member 32 can be efficiently transmitted to the toggle link mechanism 64.

As shown in FIG. 5, the toggle link mechanism 64 includes a link plate (link member) 72 which is coupled to the forked section of the knuckle Joint 62 by the aid of a knuckle pin 70, and a support lever 74 which is rotatably supported by the pair of substantially circular openings 16*a*, 16*b* formed through the first casing 46 and the second casing 48 respectively.

The link plate 72 is allowed to intervene between the knuckle Joint 62 and the support lever 74, and it functions to link the knuckle joint 62 and the support lever 74. Specifically, the link plate 72 is formed with a pair of holes 76*a*, 76*b* which are separated from each other by a predetermined spacing distance. The link plate 72 is coupled to the free end of the rod member 32 via the knuckle Joint 62 and the knuckle pin 70 rotatably attached to the first hole 76*a*. The link plate 72 is coupled to the forked section of the support lever 74 via a link pin 78 rotatably attached to the second hole 76*b*. A curved surface 81 for making contact with a guide roller (rotary means) 79 described later on is formed at a first end of the link plate 72 disposed in the vicinity of the first hole 76*a*.

As shown in FIG. 5, the support lever 74 includes a forked section which is formed with holes for rotatably attaching the link pin 78, the bearing section 18 which is formed to protrude in a direction substantially perpendicular to the axis of the rod member 32 and which has a rectangular cross section exposed to the outside from the body 12 through the opening 16*b*, a pair of circumferential sections 80*a*, 80*b* which are formed adjacently with the forked section interposed therebetween and which are fitted to the substantially circular openings 16*a*, 16*b* of the body 12 respectively, and a pair of circular arc-shaped projections 82*a*, 82*b* which are formed to slightly protrude in the lateral direction from the circumferential sections 80*a*, 80*b* and which are exposed to the outside from the body 12 through the openings 16*a*, 16*b* respectively. The arm 20 for claiming the unillustrated workpiece is detachably installed to the bearing section 18.

The support lever 74 is provided to make the rotary action integrally with the arm 20. The circular arc-shaped projections 82*a*, 82*b*, which are formed on the support lever 74, abut against plates 84*a* 84*b* fixed to the body 12. Accordingly, the circular arc-shaped projections 82*a*, 82*b* function as the stopper for stopping the rotary action of the arm 20.

The rectilinear motion of the rod member 32 is transmitted to the support lever 74 via the knuckle joint 62 and the link plate 72. The support lever 74 is provided rotatably by a predetermined angle about the center of rotation of the circumferential sections 80*a*, 80*b* which are supported by the pair of openings 16*a*, 16*b* formed through the body 12.

As shown in FIG. 5, oblong recesses 86 are formed on the side surfaces of the first casing 46 and the second casing 48 for constructing the body 12 respectively. The recesses 86 are closed by a pair of cover members 88*a*, 88*b*. The cover members 88*a*, 88*b* are installed detachably by the aid of screw members 89. In this arrangement, the bearing section 18 of the support lever 74 is provided to be exposed to the outside through a substantially circular opening 90 which is formed at a substantially central portion of the cover member 88b.

The plates 84*a*, 84*b*, which make abutment against the circular arc-shaped projections 82*a*, 82*b* of the support lever 74 to stop the rotary action of the arm 20, are fixed detachably on the wall surfaces of the recesses 86 by the aid of screw members 92.

As shown in FIG. 5, the plate 84*b* (84*a*) has a first abutment surface 96 for making abutment against a first end surface 94 of the circular arc-shaped projection 82*b* (82*a*), and a second abutment surface 100 for making abutment against a second end surface 98 of the circular arc-shaped projection 82*b* (82*a*). A curved surface 102 for surrounding the support lever 74 is formed between the first abutment surface 96 and the second abutment surface 100. The first end surface 94 and the second end surface 98 of the support lever 74 are formed so that they are separated from each other by an angle of about 90 degrees. It is a matter of course that the angle of separation between the first end surface 94 and the second end surface 98 of the support lever 74 is not limited to 90 degrees.

Figure 2:
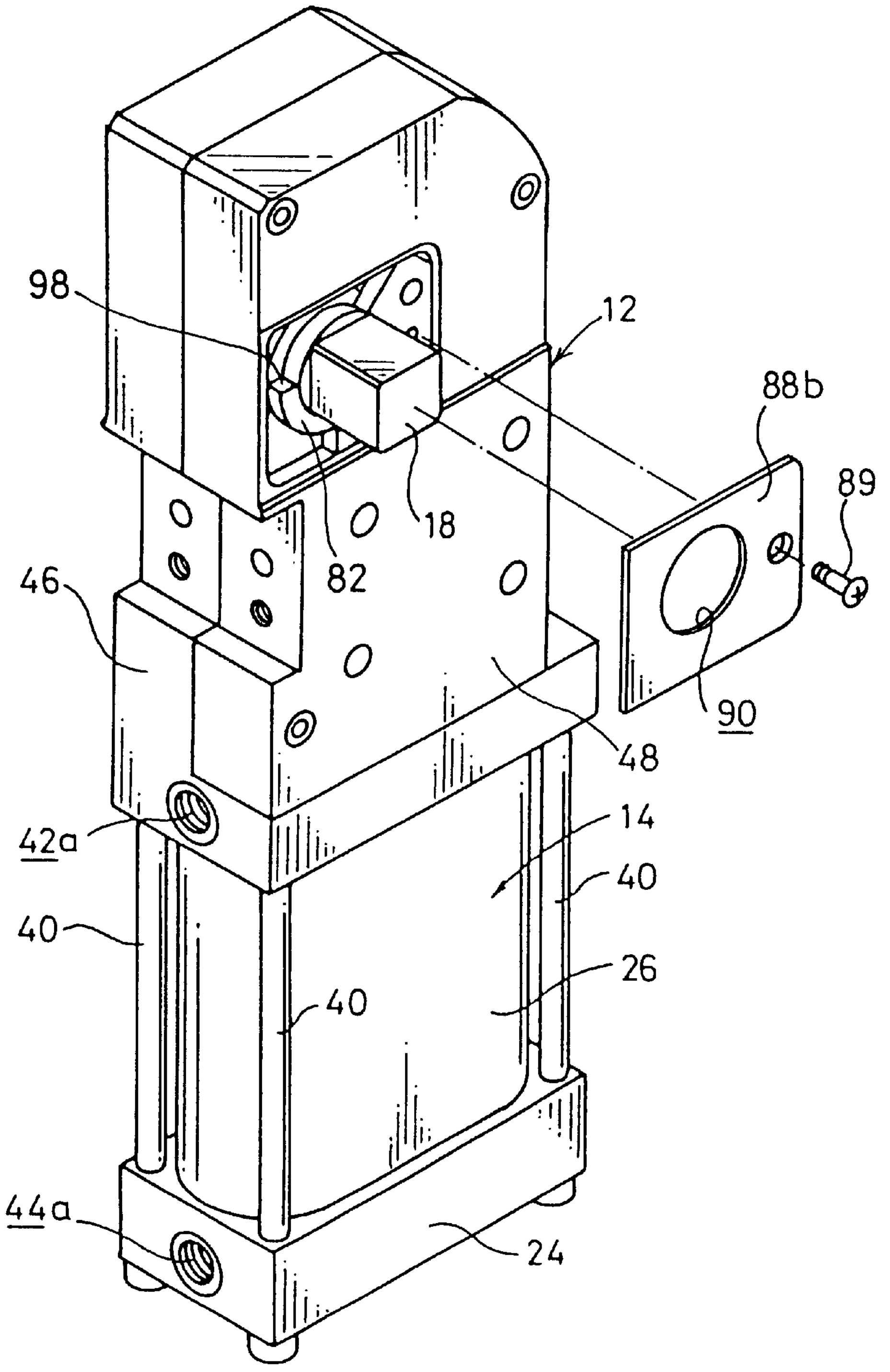
FIG. 2 shows a perspective view illustrating a state in which a cover member is detached from a body of the clamp apparatus.

In this arrangement, the pair of plates 84*a*, 84*b* can be conveniently exchanged with other plates (as described later on) with ease by detaching the pair of cover members 88*a*, 88*b* from the body 12 respectively, and loosening the screw members 92. When the pair of cover members 88*a*, 88*b* are detached from the body 12 respectively, the first end surface 94 and the second end surface 98 of the circular arc-shaped projection 82*b* (82*a*) formed on the support lever 74 are exposed to the outside as shown in FIG. 2 (however, the first end surface 94 is not shown).

As shown in FIG. 5, recesses 106 having a circular arcshaped cross section are formed on upper side portions of the inner wall surfaces of the first casing 46 and the second casing 48 for constructing the body 12 respectively. The guide roller 79, which makes the rotary action by a predetermined angle by making contact with the curved surface 81 of the link plate 72, is provided in the recesses 106. A pin member 110, which rotatably supports the guide roller 79, is secured to holes 108 formed on the first casing 46 and the second casing 48. A plurality of needle bearings 112 are installed in the circumferential direction in a through-hole of the guide roller 79. The guide roller 79 is provided to smoothly make the rotary action in accordance with the rolling action of the needle bearings 112.

Figure 6:
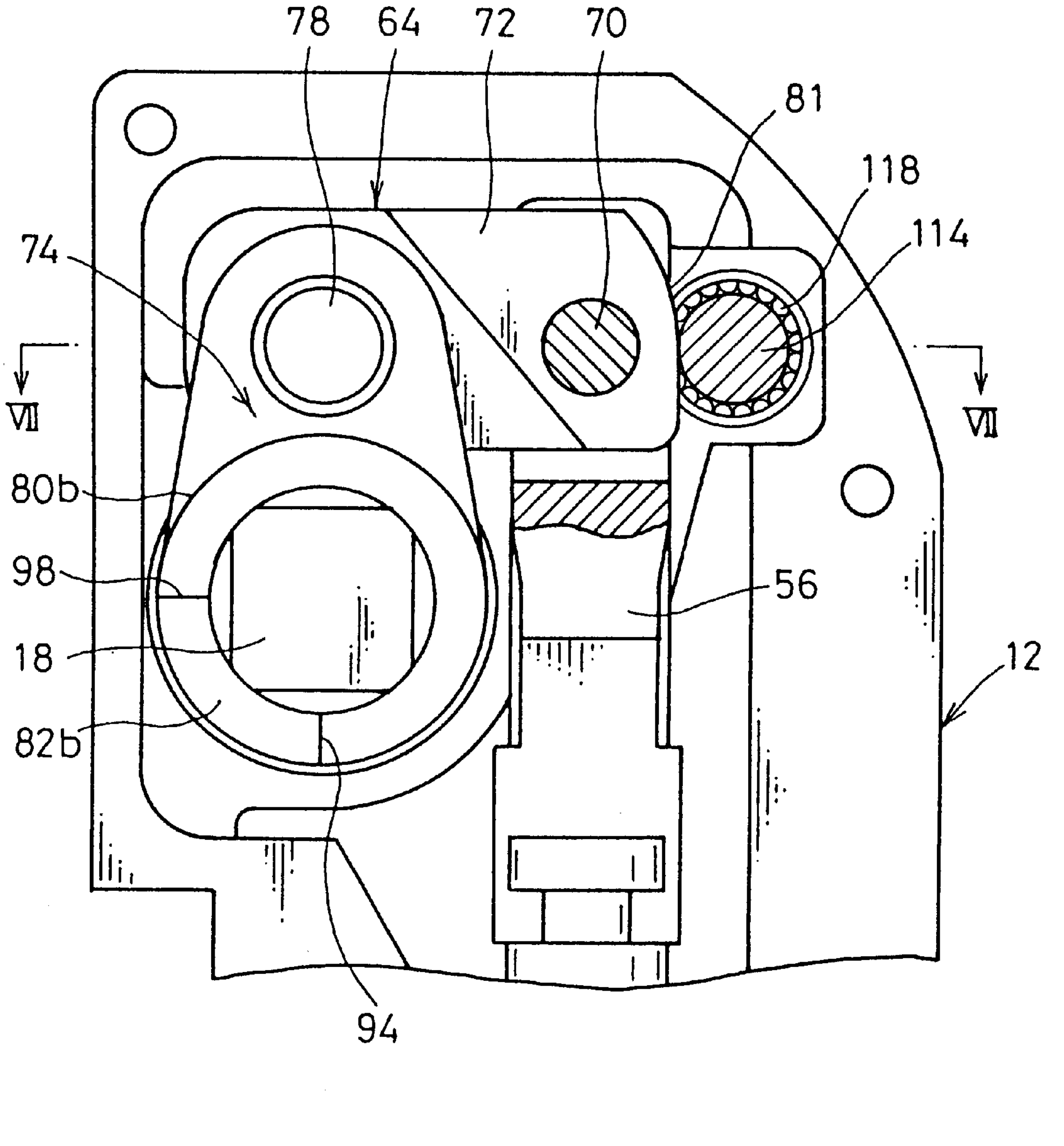
FIG. 6 shows, with partial cross section, an arrangement illustrating a modified example of a guide roller.
Figure 7:
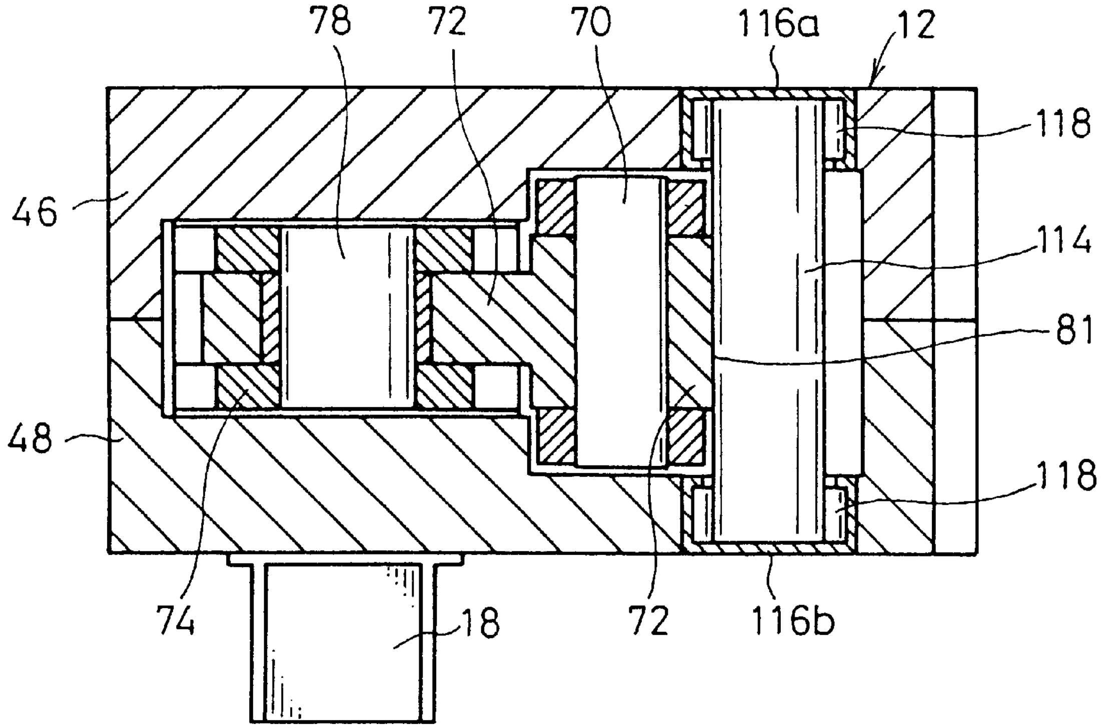
FIG. 7 shows a cross-sectional view of the arrangement taken along a line VII—VII shown in FIG. 6.

Alternatively, another arrangement is available as shown in FIGS. 6 and 7. That is, a pin member 114 may be provided to make direct contact with the curved surface 81 of the link plate 72. Both ends of the pin member 114 may be rotatably supported by a plurality of short-length needle bearings 118 installed to cap members 116*a*, 116*b* respectively.

As shown in FIG. 5, the pair of guide grooves 58, which are composed of rectangular grooves and which extend in the vertical direction, are provided mutually opposingly on the inner wall surfaces of the first casing 46 and the second casing 48. The knuckle block 58 is interposed between the pair of guide grooves 58. The knuckle block 56 is provided slidably in the vertical direction in accordance with the guiding action of the guide grooves 58.

The clamp apparatus 10 according to the embodiment of the present invention is basically constructed as described above. Next, its operation, function, and effect will be explained.

Figure 8:
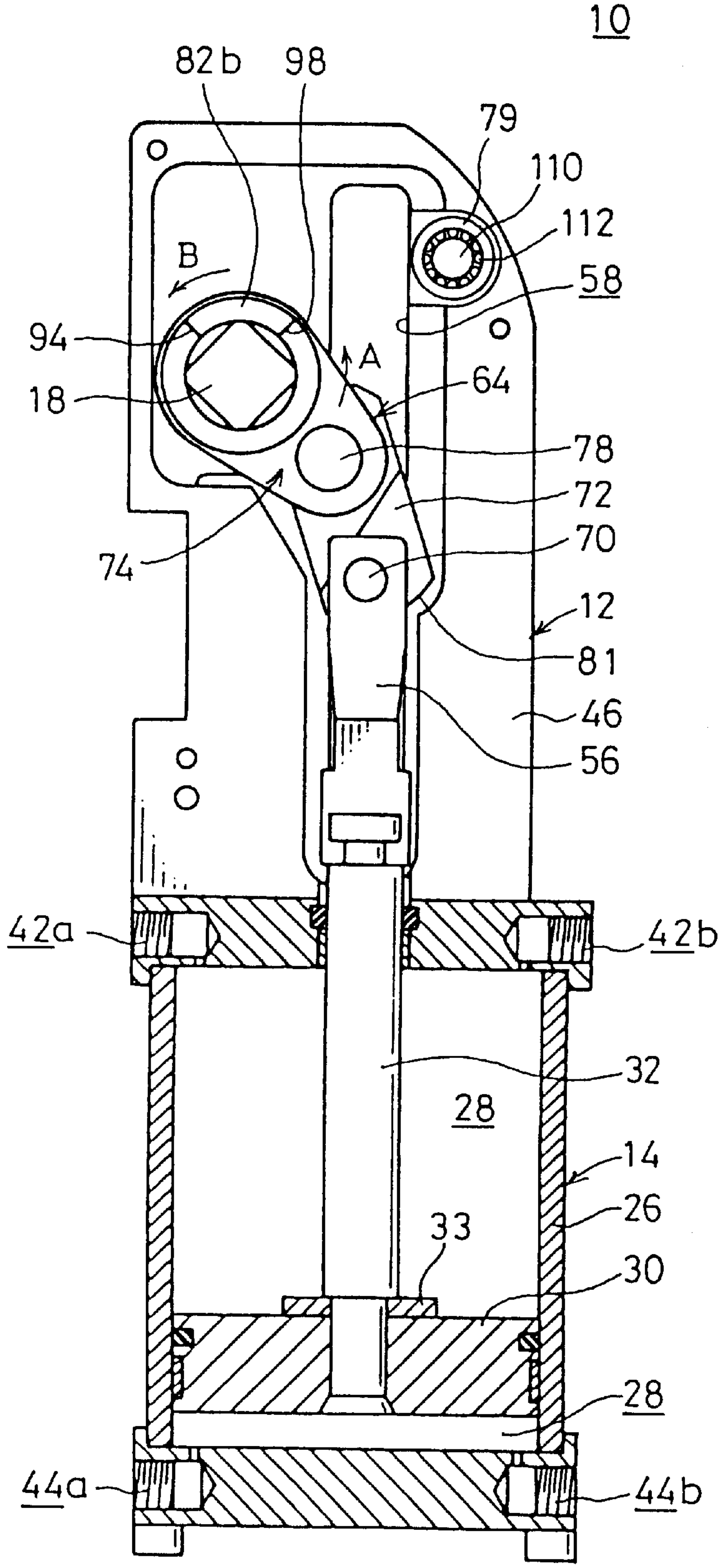
FIG. 8 shows the operation effected when an arm is at an initial position.
Figure 10:
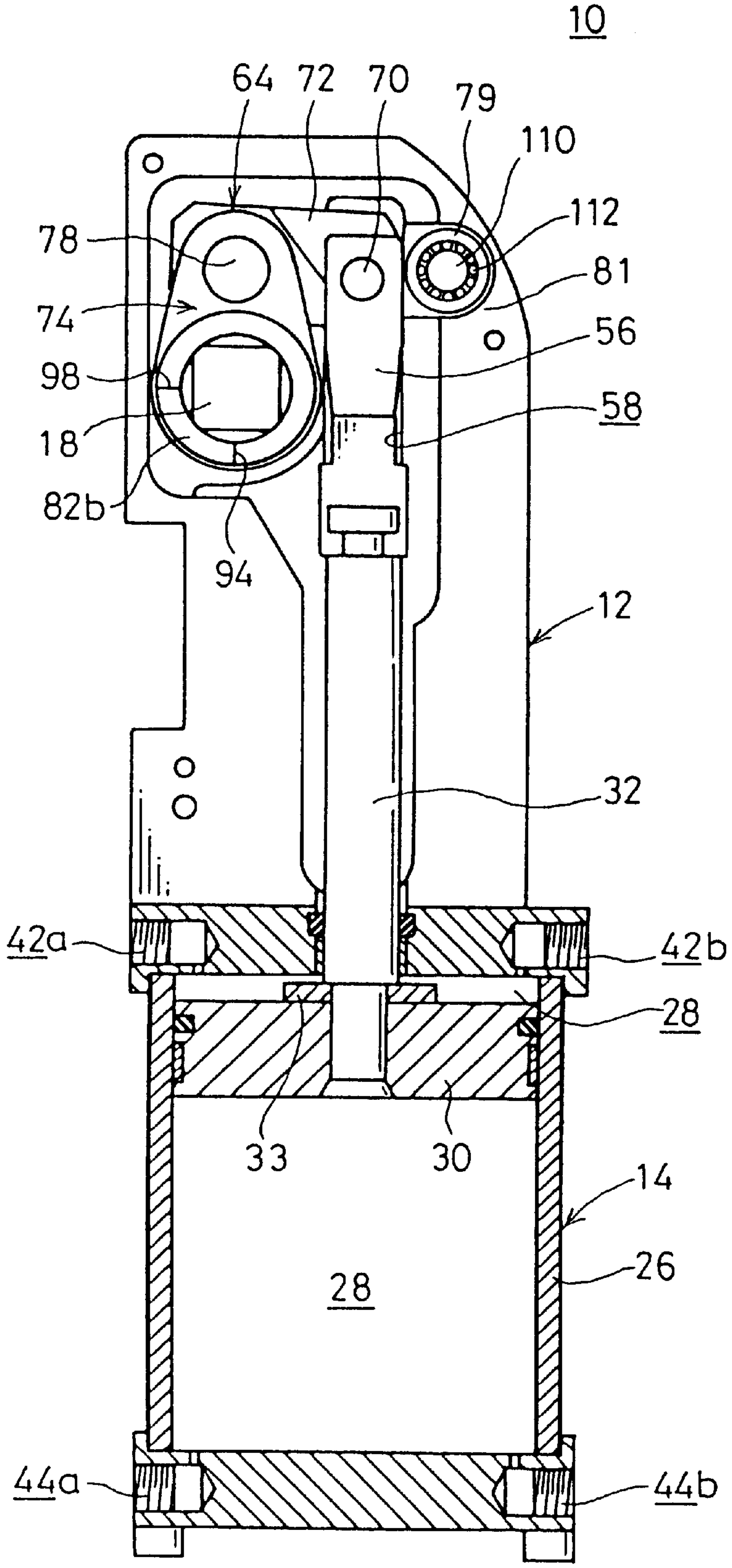
FIG. 10 shows the operation effected when a workpiece is clamped.

At first, the clamp apparatus 10 is fixed to a predetermined position by the aid of an unillustrated fixing means. First ends of pipes such as unillustrated tubes are connected to the pair of pressure fluid inlet/outlet ports 42*a*, 44*a* (42*b*, 44*b*) respectively. Second ends of the pipes are connected to an unillustrated pressure fluid supply source. FIG. 8 shows the clamp apparatus 10 in the unclamping state, and FIG. 10 shows the clamp apparatus 10 in the clamping state. The following description will be made assuming that the unclamping state shown in FIG. 8 represents the initial position.

After performing the preparatory operation as described above, the unillustrated pressure fluid supply source is energized at the initial position shown in FIG. 8 to introduce the pressure fluid (for example, compressed air) from the first pressure fluid inlet/outlet port 44*a* into the cylinder chamber 28 disposed at the lower side of the piston 30. The piston 30 is pressed in accordance with the action of the pressure fluid introduced into the cylinder chamber 28. The piston 30 is moved upwardly along the cylinder chamber 28.

The rectilinear motion of the piston 30 is transmitted to the toggle link mechanism 64 via the rod member 32 and the knuckle joint 62, and it is converted into the rotary motion of the arm 20 in accordance with the rotary action of the support lever 74 which constitutes the toggle link mechanism 64.

That is, the rectilinear motion (upward movement) of the piston 30 allows the force to act so that the link plate 72 and the knuckle joint 62 engaged with the free end of the piston rod 32 are pressed in the upward direction. Owing to the pressing force exerted on the link plate 72, the link plate 72 is rotated by a predetermined angle about the support point of the knuckle pin 70, and the support lever 74 is rotated in the direction of the arrow A in accordance with the linking action of the link plate 72.

Therefore, the arm 20 is rotated by a predetermined angle in the direction of the arrow B about the support point of the bearing section 18 of the support lever 74. Accordingly, the circular arc-shaped projection 82*b* (82*a*) is rotated by the predetermined angle integrally with the support lever 74.

Figure 9:
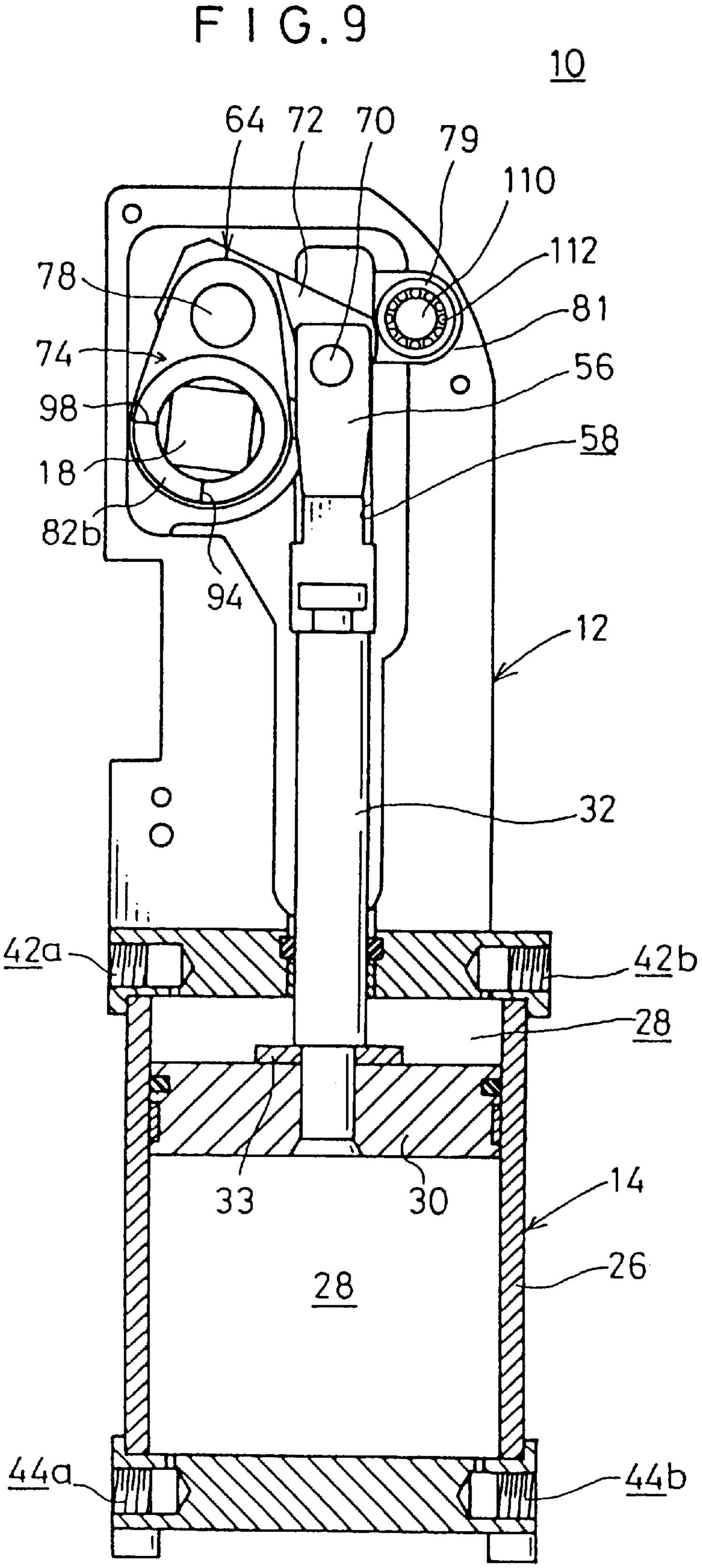
FIG. 9 shows the operation illustrating a state in which a rod member is moved upwardly from the initial position, and a curved surface of a link plate contacts with the guide roller.

During the process in which the arm 20 is rotated in the direction of the arrow B as described above, the curved surface 81 of the link plate 72 contacts with the guide roller 79 as shown in FIG. 9. The guide roller 79 is rotated about the center of the pin member 110 while maintaining the state of contact with the curved surface 81.

The arm 20 is further rotated, and the first end surface 94 of the circular arc-shaped projection 82*b* (82*a*) abuts against the first abutment surface 96 of the plate 84*b* (84*a*) gwhich is fixed to the body 12 as shown in FIG. 10. Accordingly, the arm 20 stops the rotary action. As a result, the clamping state is given, in which the workpiece is clamped by the arm 20.

After the arm 20 stops the rotary action to give the clamping state, the piston 30 and the rod member 32 are further moved slightly upwardly. The spacer 33 abuts against the wall surface of the projection 50. Accordingly, the piston 30 and the rod member 32 are stopped to give the terminal end position of the displacement (see FIG. 3). On the other hand, when the pressure fluid is supplied to the pressure fluid Inlet/outlet port 42*a* in accordance with the switching action of an unillustrated changeover valve in the state shown in FIG. 3, the piston 30 is moved downwardly. Further, the support lever 74 is rotated in a direction opposite to the direction described above by the aid of the link plate 72 in accordance with the. downward movement action of the rod member 32. Accordingly, the arm 20 is rotated in a direction to make separation from the workpiece.

During the process in which the arm 20 is rotated in the direction to make separation from the workpiece, the second end surface 98 of the circular arc-shaped projection 82*b* (82*a*) abuts against the second abutment surface 100 of the plate 84*b* (84*a*) which is fixed to the body 12. Accordingly, the arm 20 stops the rotary action. As a result, the clamp apparatus 10 is restored to the initial position shown in FIG. 8.

Next, explanation will be made for the case in which the reaction force, which is generated corresponding to the clamping force when the workpiece is clamped, is balanced with the force to be balanced with the reaction force.

Figure 11:
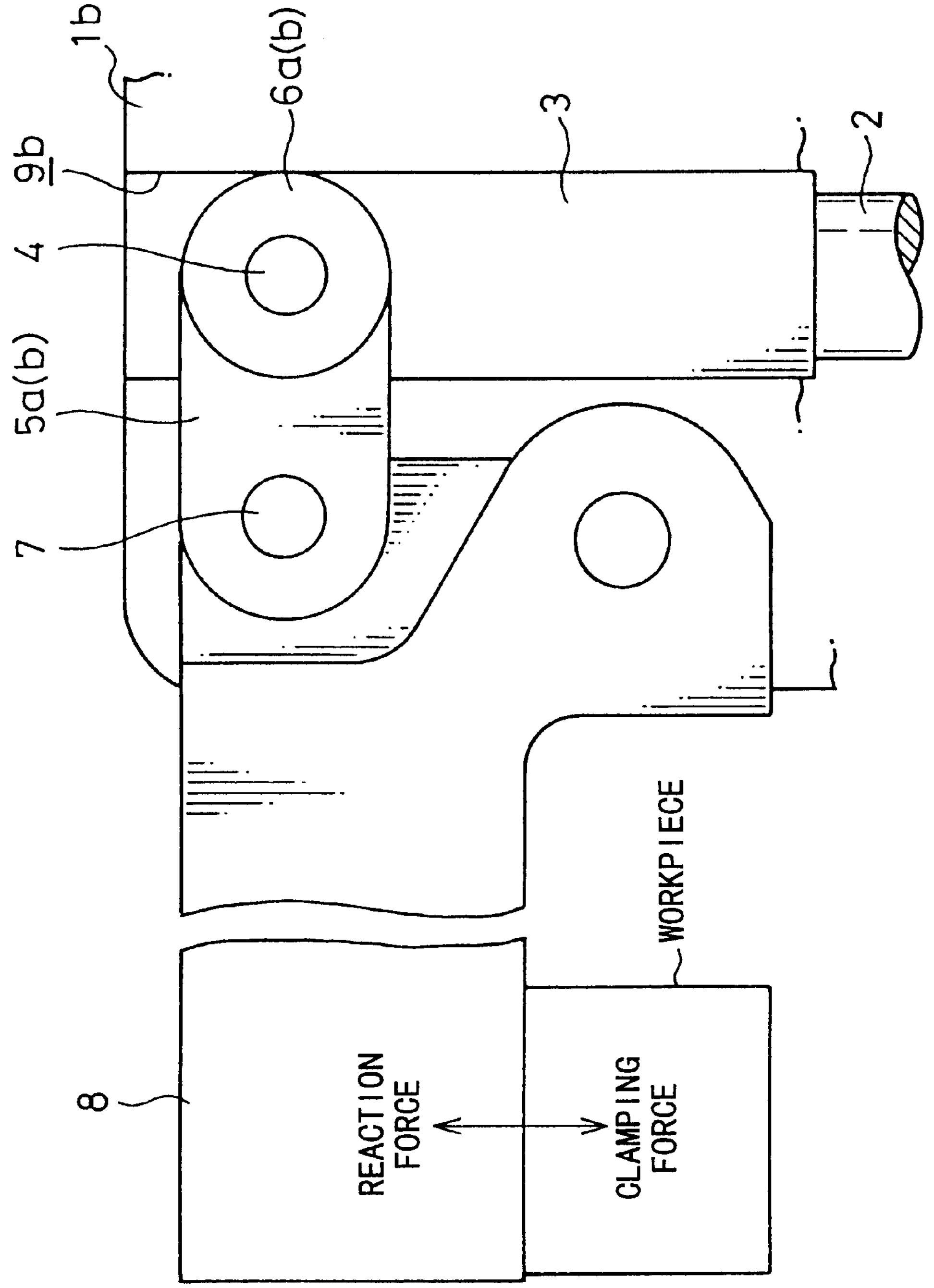
FIG. 11 shows a partial magnified view for illustrating a route of transmission of the reaction force in the clamp cylinder concerning the conventional technique.

In the case of the clamp cylinder concerning the conventional technique, as shown in FIG. 11, when the workplace is clamped, the reaction force is generated in the direction opposite to the clamping force. The reaction force is transmitted to the second shaft 7 via the arm 8, and it is further transmitted via the links 5*a*, 5*b* to the pair of rollers 6*a*, 6*b* rotatably supported by the first shaft 4 to balance the reaction force with the force to be balanced with the reaction force. Therefore, in the case of the clamp cylinder concerning the conventional technique, the force corresponding to the reaction force is applied to the first shaft 4 which rotatable supports the pair of rollers 6*a*, 6*b* . For this reason, it is necessary to design the first shaft to have the large diameter.

Figure 12:
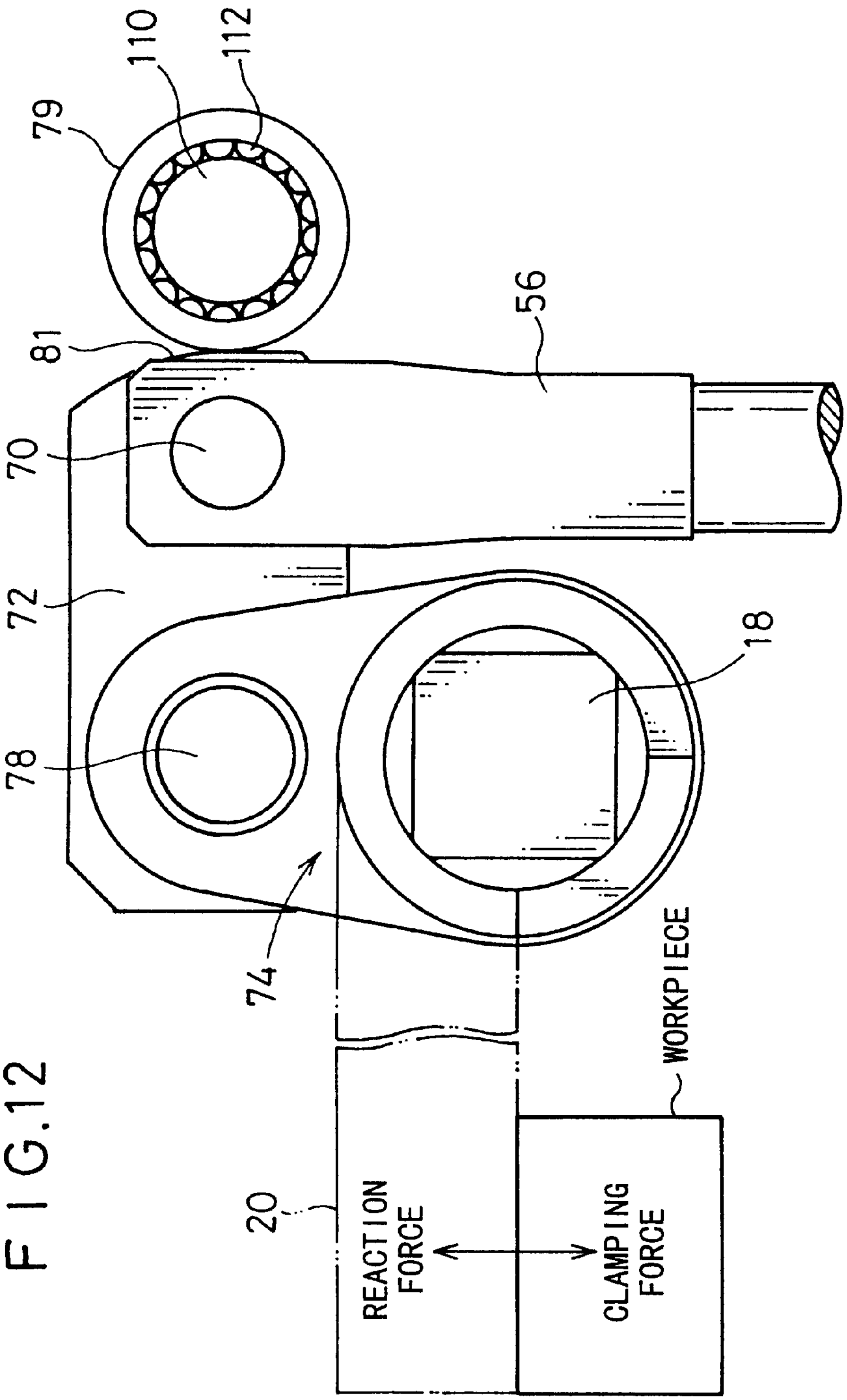
FIG. 12 shows a partial magnified view for illustrating a route of transmission of the reaction force in the clamp cylinder according to the embodiment of the present invention.

On the contrary, in the case of the embodiment of the present invention, as shown in FIG. 12, the reaction force is transmitted via the arm 20 to the link pin 78, and it is further transmitted to the guide roller 79 which contacts with the curved surface 81 of the link plate 72. In this arrangement, the guide roller 79 is rotatably supported by the pin member 110 fixed to the holes 108 (see FIG. 5) of the first casing 46 and the second casing 48. The reaction force, which is transmitted to the guide roller 79, is applied to the pin member 110 fixed to the first and second casings 46, 48.

Therefore, the embodiment of the present invention is designed such that the force corresponding to the reaction force is not applied at all to the knuckle pin 70. Accordingly, it is possible to decrease the diameter of the knuckle pin 70. Further, it is possible to improve the durability of the connecting portion between the knuckle block 56 and the link plate 72.

In the conventional technique, it is necessary to design the width and the diameter of the rollers 6*a*, 6*b*, considering the surface pressure and the strength of the pair of rollers 6*a*, 6*b* which slidably move on the track grooves 9*b*. On the contrary, in the embodiment of the present invention, it is unnecessary to make such a design, and hence it is possible to realize a small size of the body 12.

Next, investigation will be made for the angle formed at the point of action of the force when the workpiece is clamped by the arm.

Figure 13:
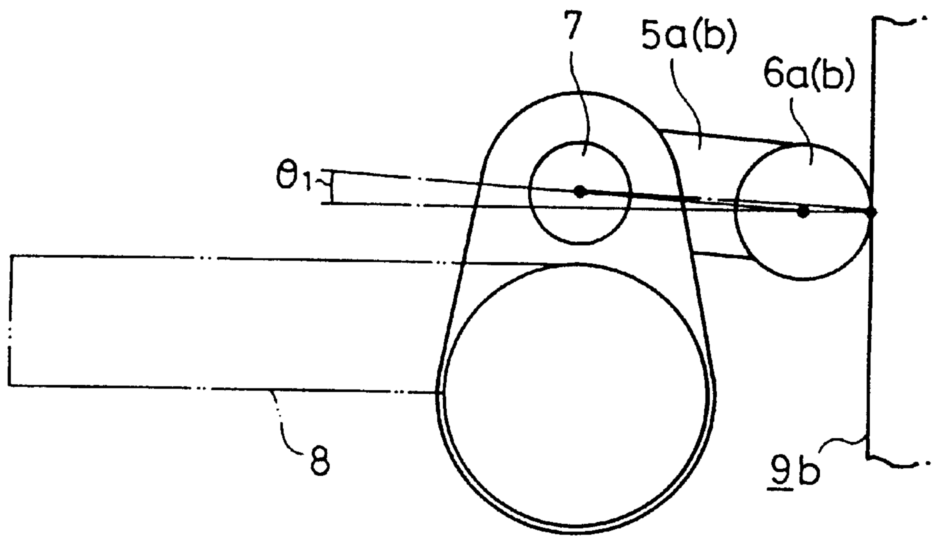
FIG. 13 illustrates an angle formed at the point of action of the force in the clamp cylinder concerning the conventional technique.
Figure 14:
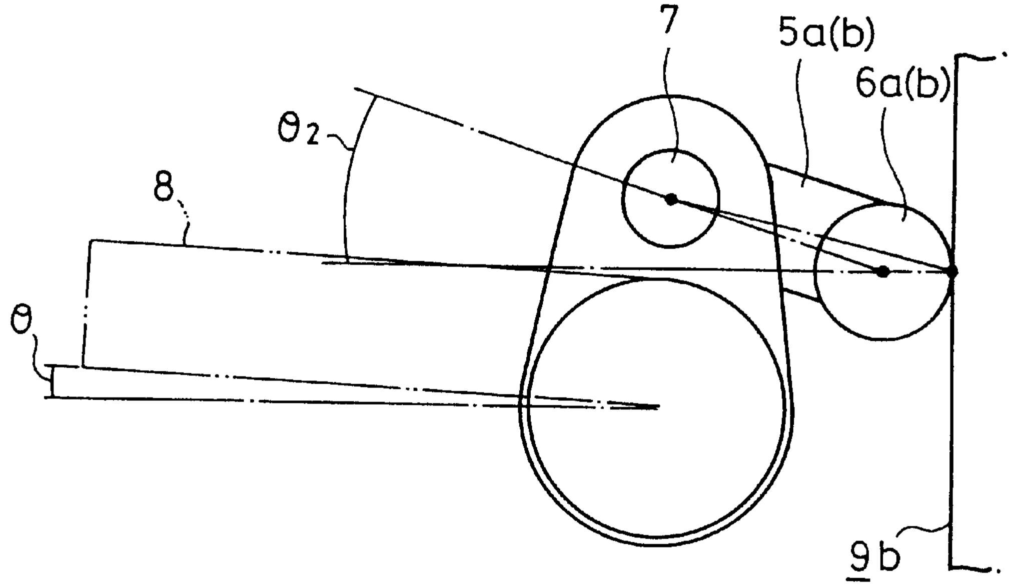
FIG. 14 illustrates a state in which the arm is displaced by an angle $\theta$ from the state shown in FIG. 13.

In the clamp cylinder concerning the conventional technique, it is assumed that $\theta_1$ represents the angle formed at the point of action of the force in the state in which the workpiece is clamped by the arm 8 substantially in the horizontal state (see FIG. 13), and $\theta_2$ represents the angle formed at the point of action of the force when the angle of the arm 8 during the clamping is changed by an angle $\theta$ in the clockwise direction (see FIG. 14). As clearly understood from comparison between FIG. 13 and FIG. 14, in the case of the conventional technique, when the angle of rotation of the arm 8 during the clamping of the workplace is changed, the angle ($\theta_1$, $\theta_2$) formed at the point of action of the force is greatly changed.

Figure 15:
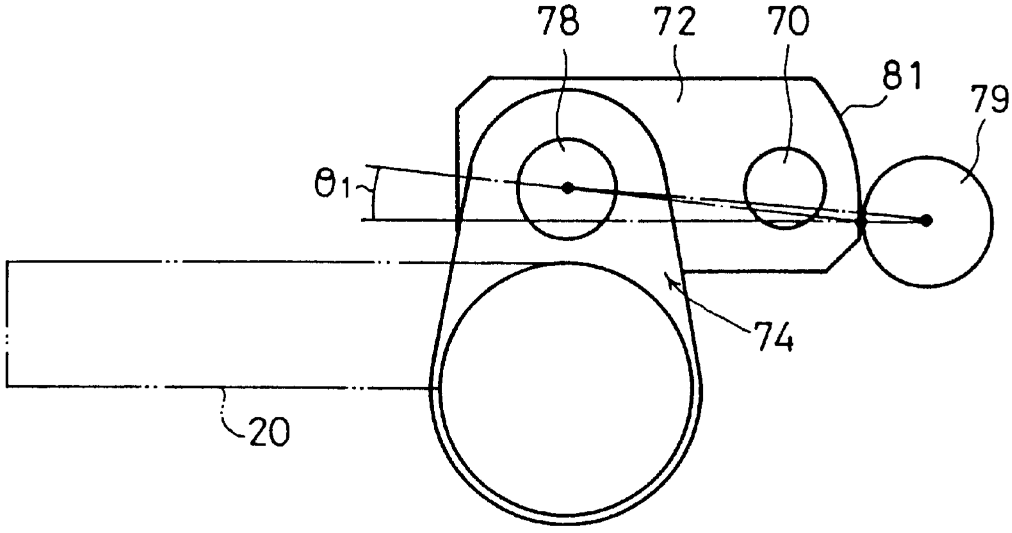
FIG. 15 illustrates an angle formed at the point of action of the force.in the clamp apparatus according to the embodiment of the present invention.
Figure 16:
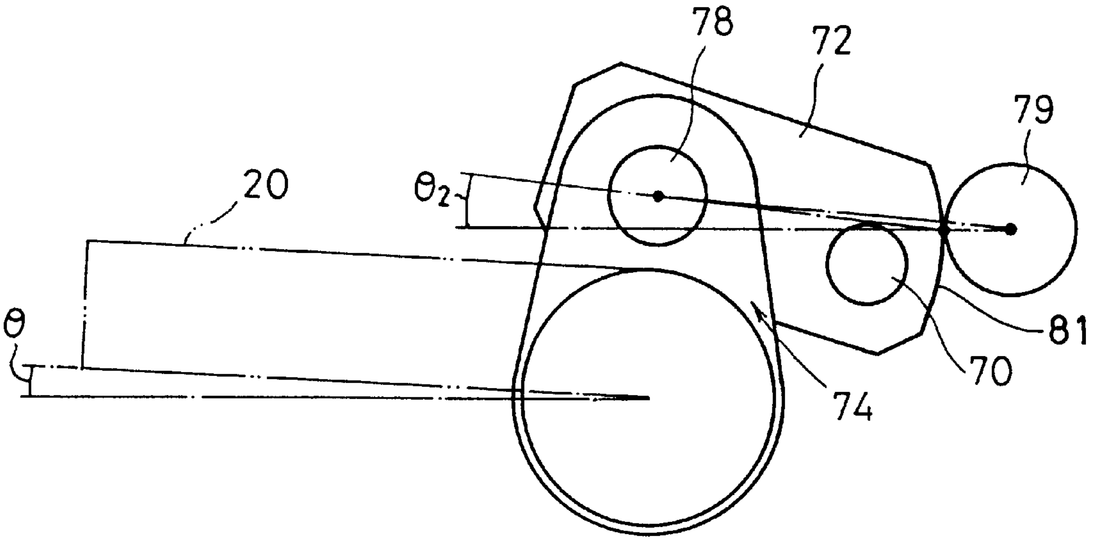
FIG. 16 illustrates a state in which the arm is displaced by an angle $\theta$ from the state shown in FIG. 15.

On the contrary, in the embodiment of the present invention, the angle formed at the point of action of the force is substantially constant even when the angle of rotation of the arm 20 during the clamping of the workpiece is changed by the angle $\theta$ from the angle $\theta_1$ formed at the point of action of the force in the state in which the workpiece is clamped by the arm 20 substantially in the horizontal state (see FIG. 15) to the angle $\theta_2$ (see FIG. 16).

Figure 17:
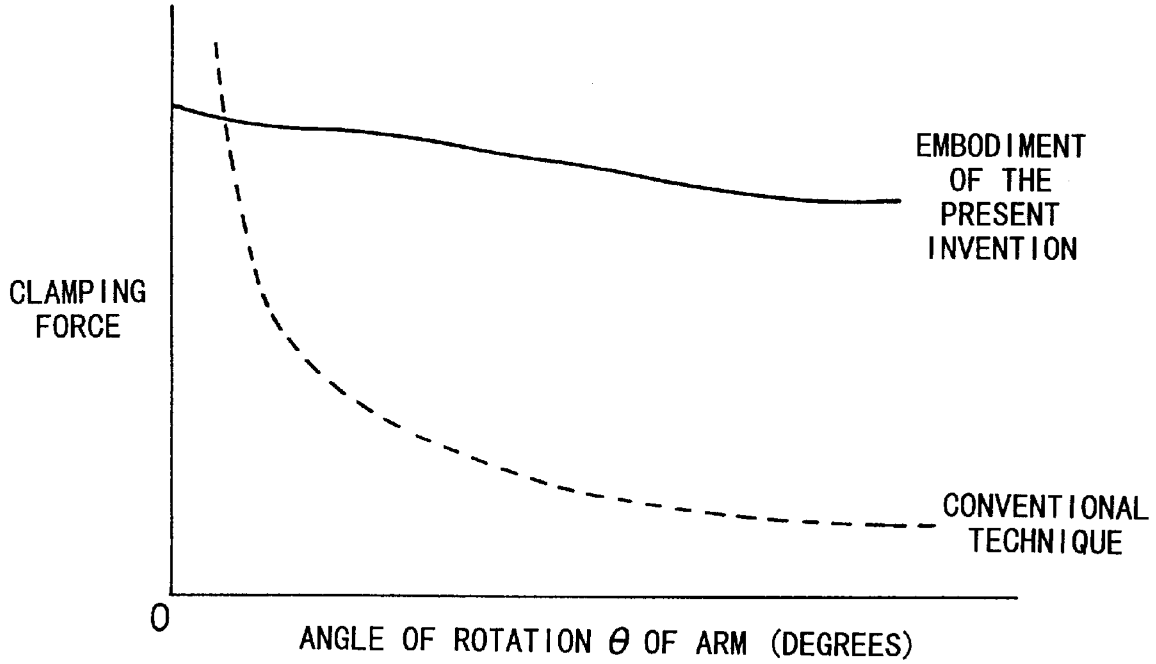
FIG. 17 illustrates the relationship between the angle of rotation $\theta$ of the arm and the clamping force.

According to this fact, as clearly understood from FIG. 17 as well, the clamping force is substantially constant in the embodiment of the present invention (solid line) even when the angle of rotation of the arm 20 is increased. On the contrary, the conventional technique (broken line) is inconvenient in that the clamping force is quickly decreased when the angle of rotation of the arm 8 is increased.

Therefore, the embodiment of the present invention has the following effect. That is, even when the apparatus is set such that the workpiece is clamped by the arm 20 at a desired angle of rotation depending on, for example, the condition of the use by a user, it is possible to obtain a substantially constant clamping force.

Further, in the embodiment of the present invention, the spacer 33, which regulates the terminal end position of the displacement of the piston 30, is provided at the connecting portion between the rod member 32 and the piston 30 at the inside of the cylinder unit 14. Accordingly, it is possible to reliably avoid the invasion into the top dead center (dead point) by means of the simple structure.

Next, explanation will be made with reference to FIGS. 18 to 20 for the arrangement in which the contact portion between the curved surface 81 of the link plate 72 and the guide roller 79 is maintained at a substantially constant position irrelevant to the angle of rotation of the arm 20.

Figure 18:
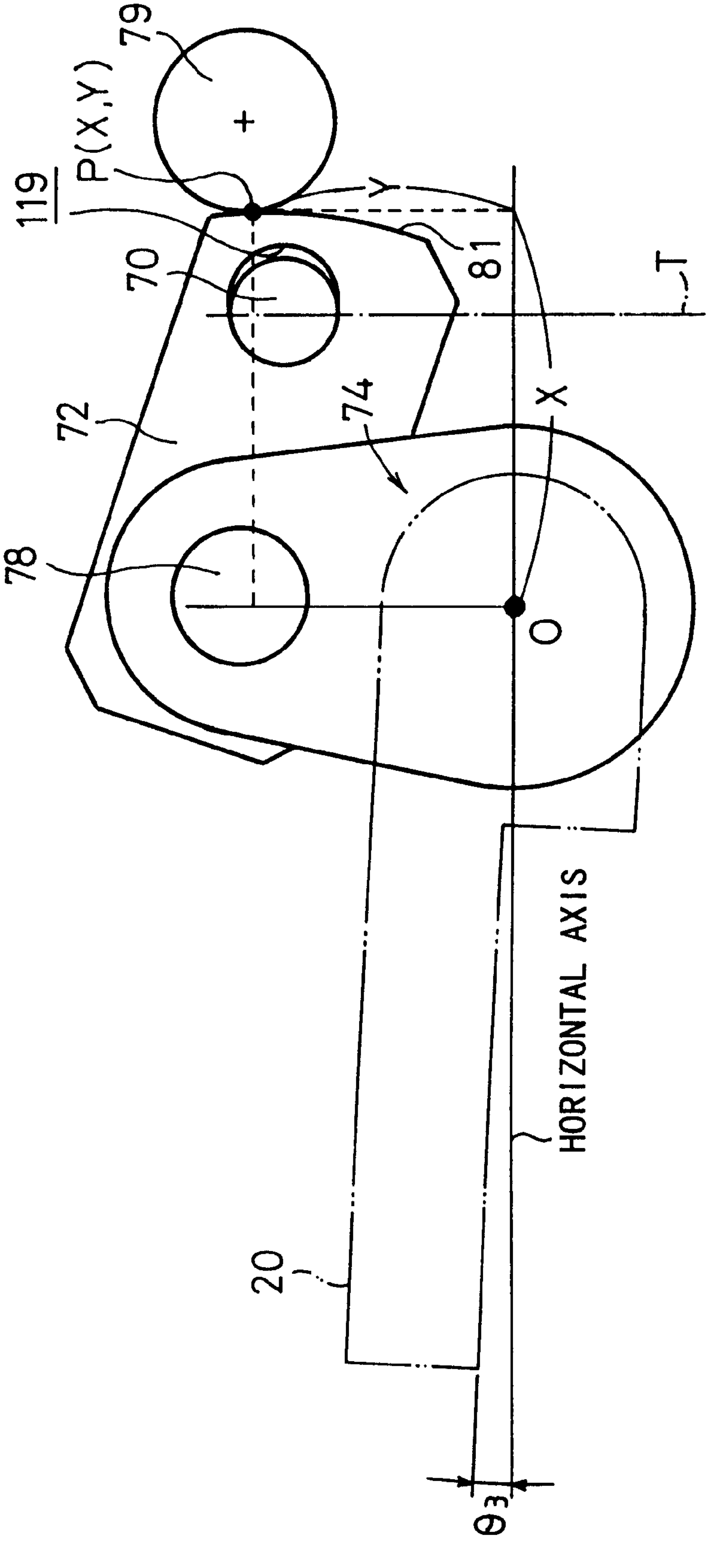
FIG. 18 illustrates the point of contact between the curved surface of the link plate and the guide roller in a state in which the arm is rotated by an angle $\theta_3$ with respect to the horizontal axis.

FIG. 18 shows a state in which the arm 20 makes the rotary action from the initial position of the unclamping state to clamp the workpiece at an angle $\theta_3$ with respect to the horizontal axis. FIG. 19 shows a state in which the arm 20 further makes the rotary action from the state shown in FIG. 18 to clamp the workpiece at an angle $\theta_4$ with respect to the horizontal axis. FIG. 20 shows a state in which the arm 20 clamps the workpiece substantially in the horizontal state.

Figure 19:
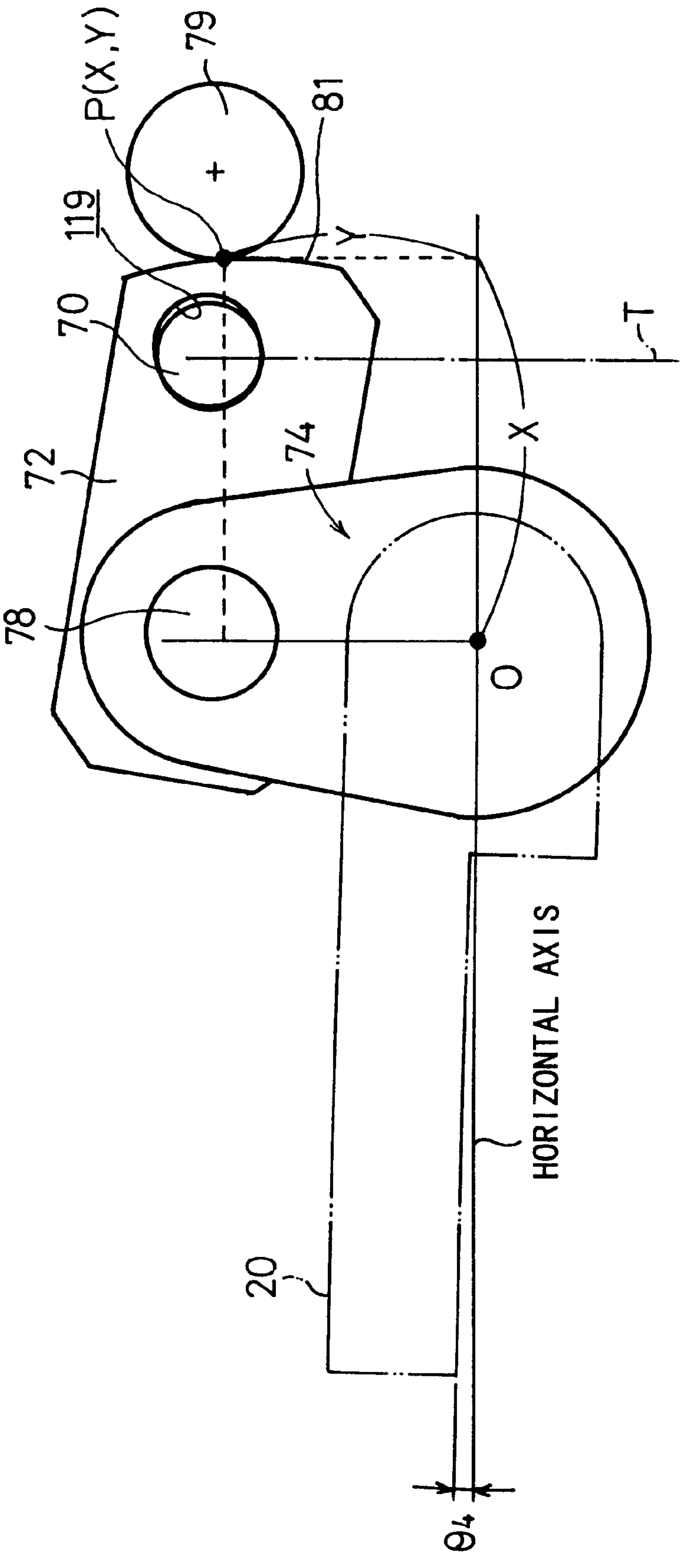
FIG. 19 illustrates the point of contact between the curved surface of the link plate and the guide roller in a state in which the arm is rotated by an angle $\theta_4$ with respect to the horizontal axis.
Figure 20:
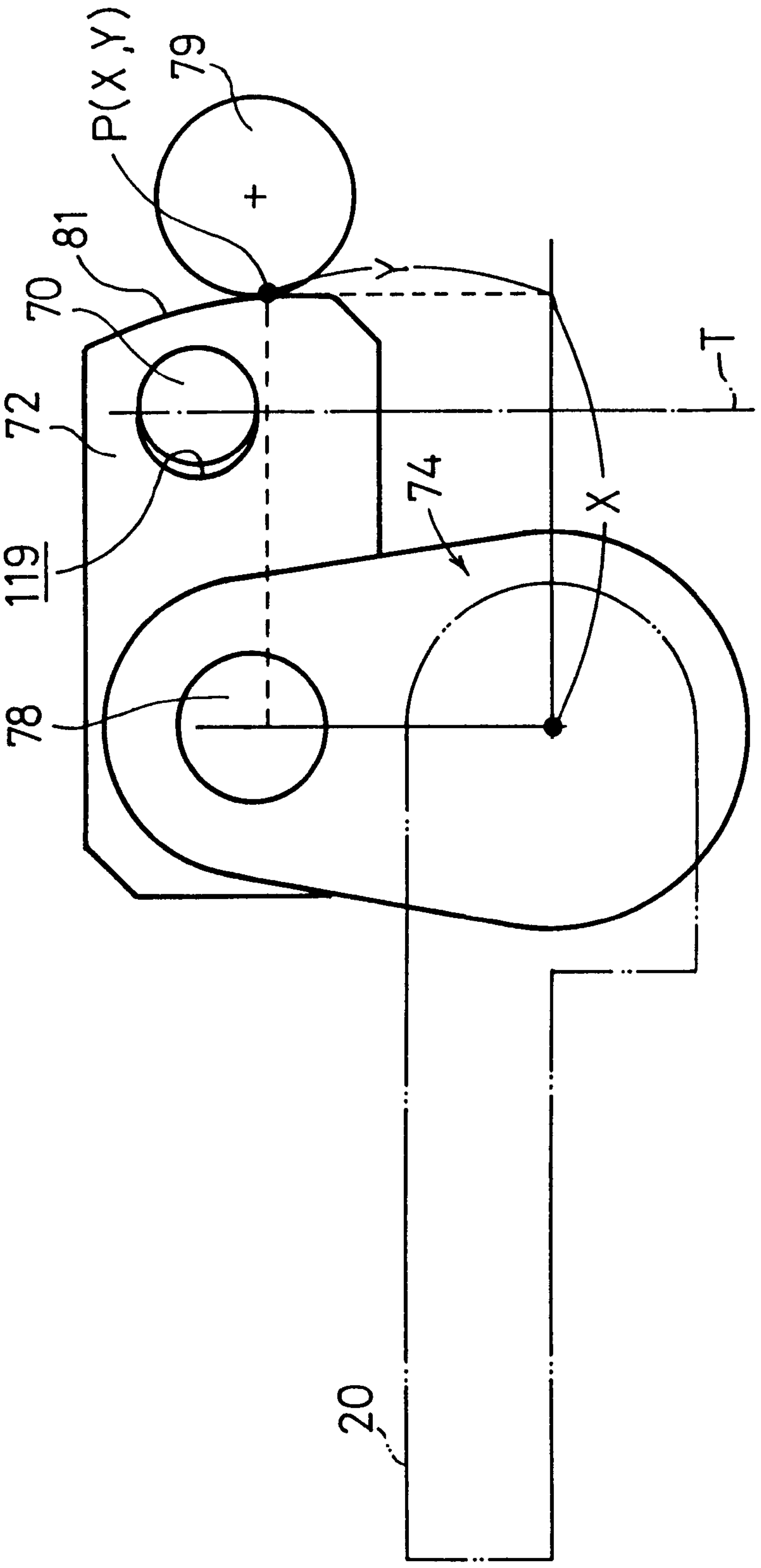
FIG. 20 illustrates the point of contact between the curved surface of the link plate and the guide roller in a state in which the arm is substantially in the horizontal state.

In the arrangement shown in FIGS. 18 to 20, a long hole 119, which functions as a contact position-holding mechanism, is formed in the link plate 72 so that the knuckle pin 70 is engaged with the long hole 119. The long hole 119 is formed in the link plate 72 to provide the looseness for the knuckle pin 70. Accordingly, the contact portion between the guide roller 79 and the curved surface 81 formed on the link plate 72 can be maintained at a substantially constant position regardless of the angle of rotation of the arm 20.

The degree of freedom of the knuckle pin 70 is ensured, and thus the central point of the knuckle pin 70 can be set on the extension line of the axis T of the rod member 32. As a result, the linear accuracy of the rod member 32 is effectively maintained, and thus it is possible to improve the durability of the cylinder unit 14.

The contact portion between the curved surface 81 and the guide roller 79 is actually based on the line-to-line contact. However, in FIGS. 18 to 20, the contact portion is depicted as the contact point P for convenience of the explanation. The position of the contact point P is represented by the X coordinate and the Y coordinate (X, Y) assuming that the center of rotation of the arm 20 is the origin O.

As clearly understood from FIGS. 18 to 20, even when the angle of rotation of the arm 20 is changed, the contact point P between the guide roller 79 and the curved surface 81 of the link plate 72 is always identical, and it is at the constant position (X, Y). Therefore, it is possible to obtain the further linear clamping characteristic so that the clamping force is substantially constant irrelevant to the change of the angle of rotation of the arm 20 by maintaining, at the constant position, the contact point P between the guide roller 79 and the curved surface 81 of the link plate 72 to avoid the occurrence of any scuffing at the contact portion between the link plate 72 and the guide roller 79.

In FIGS. 18 to 20, the origin O of the rectangular coordinates system is set at the center of rotation of the arm 20. However, it is a matter of course that the center of rotation of the guide roller 79 is alternatively used as the origin O.

Figure 21:
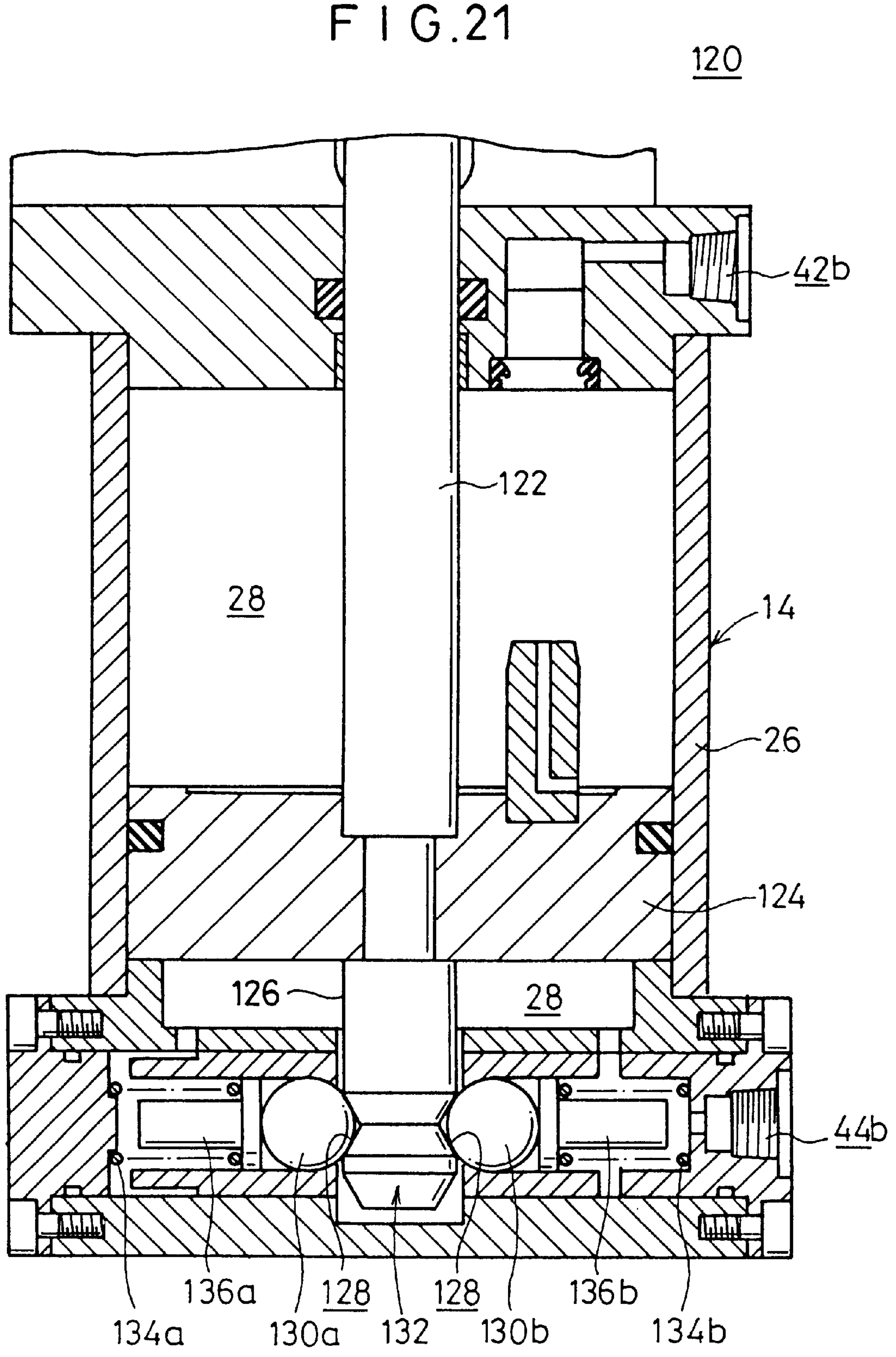
FIG. 21 shows a partial longitudinal sectional view illustrating a clamp apparatus according to another embodiment of the present invention.
Figure 22:
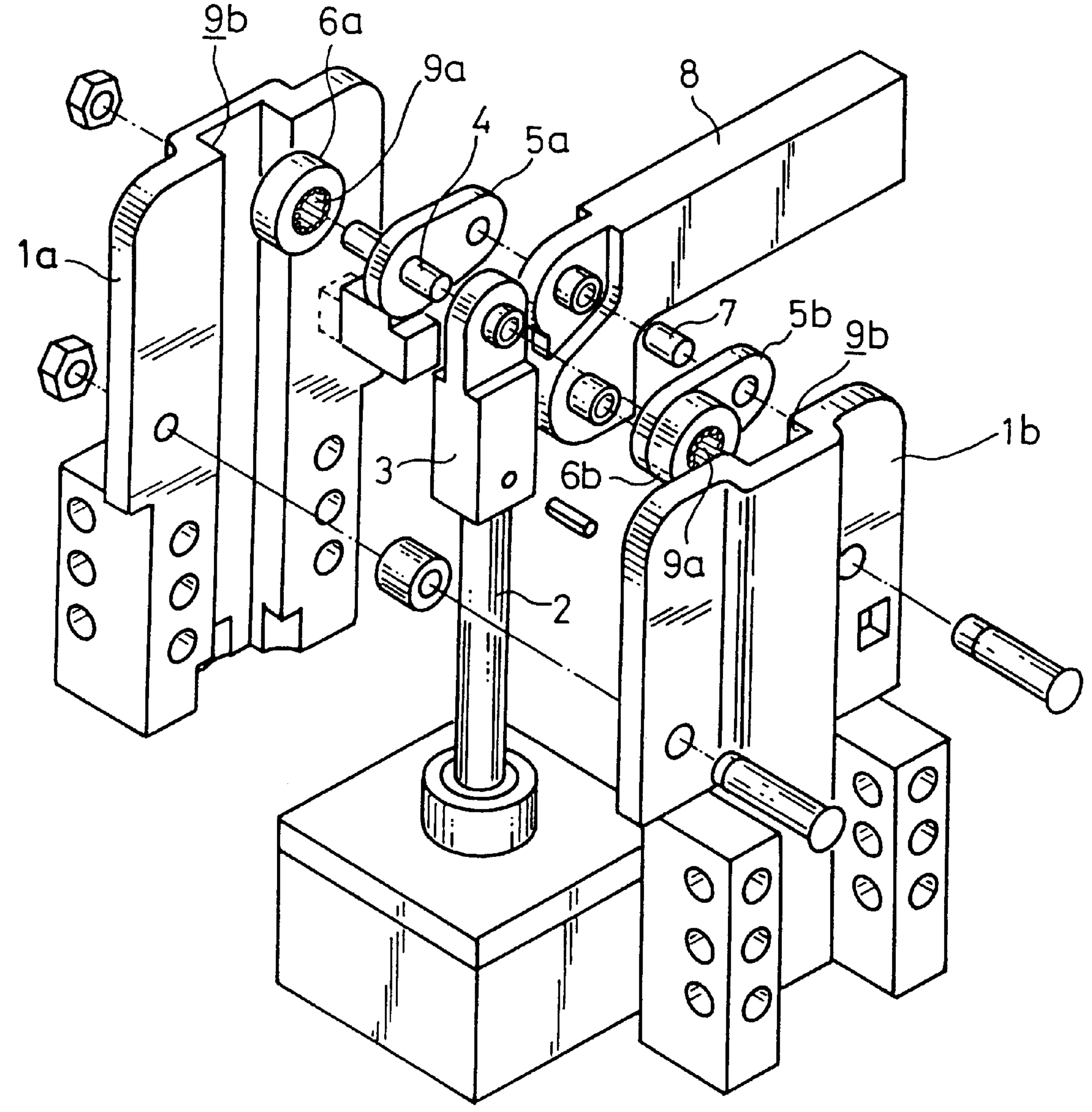
FIG. 22 shows an exploded perspective view illustrating major components of the clamp cylinder concerning the conventional technique.
Figure 23:
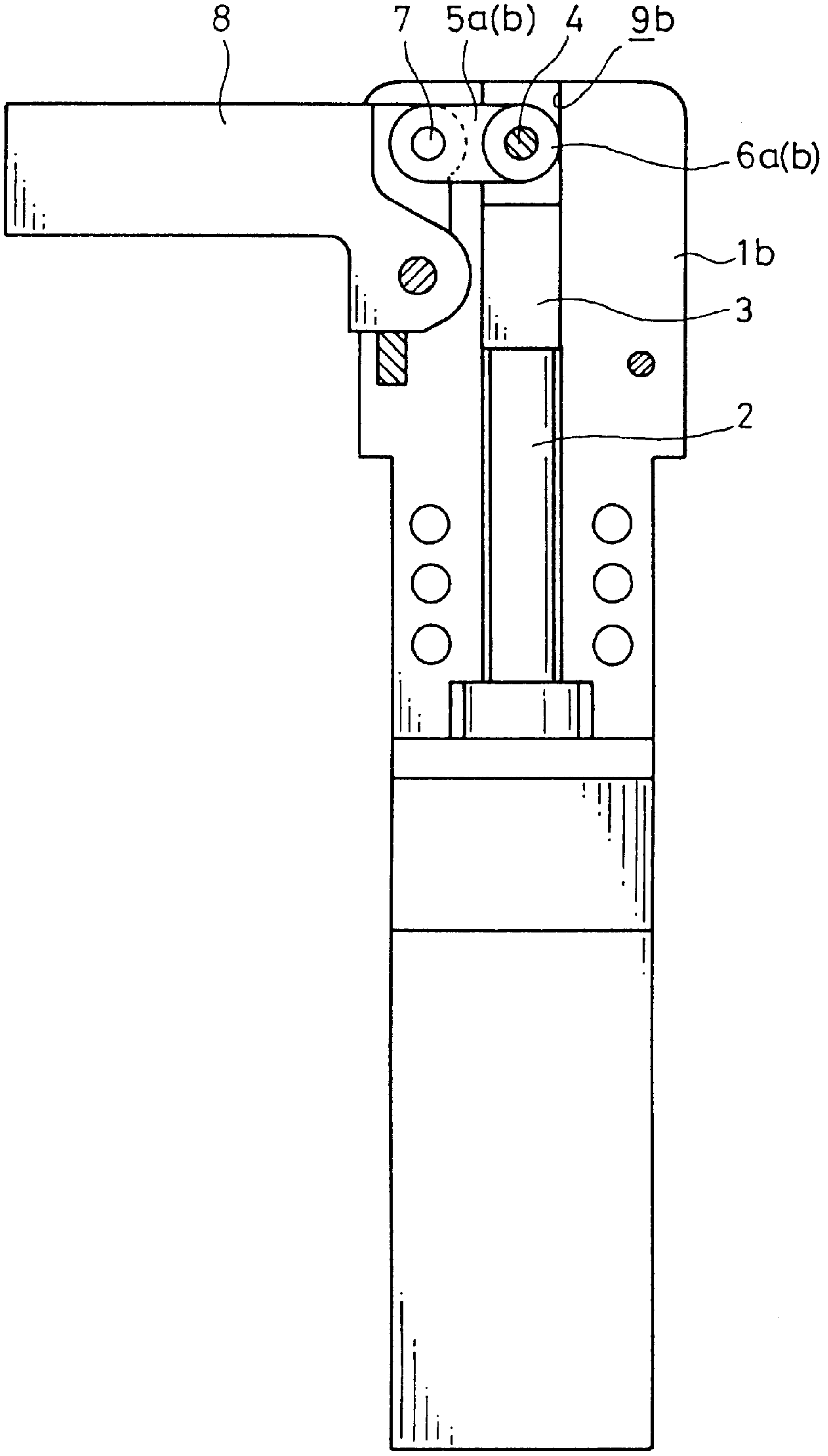
FIG. 23 shows, with partial cross section, a side view illustrating the clamp cylinder shown in FIG. 22.

Next, a clamp apparatus 120 according to another embodiment is shown in FIG. 21. The same constitutive components as those of the clamp apparatus 10 shown in FIG. 3 are designated by the same reference numerals, detailed explanation of which will be omitted.

The clamp apparatus 120 has the following feature. That is, a projection 126 is coaxially connected on a side opposite to a piston 124 provided with a rod member 122. A lock mechanism 132 is provided for locking the piston 124 by using a pair of balls 130*a*, 130*b* which are engaged with an annular recess 128 of the projection 126.

The lock mechanism 132 has a pair of pressing members 136*a*, 136*b* for pressing the balls 130*a*, 130*b* toward the annular recess 128 in accordance with the action of the resilient force of spring members 134*a*, 134*b*, and it functions to maintain the arm 20 at the initial position. The provision of the lock mechanism 132 has the following advantage. That is, even when the piston 124 is allowed to be in a free state by discharging the pressure fluid from the cylinder chamber 28, then the piston 124 is in the locked state, and it is prevented from displacement. Therefore, the rotary action of the arm 20 is avoided, and the arm 20 can be locked at the initial position.

In the embodiment of the present invention, the cylinder is used as the driving mechanism. However, there is no limitation thereto. It is also preferable that the rod member 32 is displaced by using, for example, an unillustrated linear actuator or an electric motor.

What is claimed is:

1. A clamp apparatus comprising:

a body;

a driving mechanism for displacing a rod member provided at the inside of said body in an axial direction of said body;

a toggle link mechanism including a link member connected to said rod member, for converting rectilinear motion of said rod member into rotary motion;

an arm connected to said toggle link mechanism, for making rotation by a predetermined angle in accordance with a driving action of said driving mechanism; and a rotary member supported by said body, said rotary member being rotatable while making contact with said link member.

2. The clamp apparatus according to claim 1, wherein said rotary member is composed of a guide roller rotatably supported by a pin member fixed to said body.

3. The clamp apparatus according to claim 1, wherein said rotary member is composed of a pin member provided rotatably by the aid of a bearing member.

4. The clamp apparatus according to claim 1, wherein said driving mechanism includes at least a cylinder.

5. The clamp apparatus according to claim 1, wherein a curved surface having a circular arc-shaped cross section with a predetermined radius of curvature for making contact with said rotary member is formed at one end of said link member.

6. The clamp apparatus according to claim 1, further comprising a contact position-holding mechanism for maintaining, at a substantially constant position, a contact portion between said link member and said rotary member irrelevant to an angle of rotation of said arm.

7. The clamp apparatus according to claim 6, wherein said contact position-holding mechanism is composed of a long hole formed In said link member, for making engagement with a kauuckle pin provided on one end side of said rod member.

8. The clamp apparatus according to claim 6, wherein a contact point between said link member and said rotary member is maintained at a substantially constant position determined by an X coordinate and a Y coordinate based on an origin of a center of rotation of said arm or a center of rotation of said rotary member.

9. The clamp apparatus according to claim 4, wherein said cylinder is provided with a lock mechanism for maintaining said arm in an unclamping state by locking said piston at a predetermined position.

10. The clamp apparatus according to claim 9, wherein said lock mechanism includes a projection connected to said piston coaxially with said rod member, a pair of balls for making engagement with an annular recess formed on said projection, and a pair of pressing members for pressing said pair of balls toward said annular recess respectively in accordance with an action of resilient force of spring members.

* * * * *